(12) United States Patent
Deopura

(10) Patent No.: US 10,268,772 B2
(45) Date of Patent: Apr. 23, 2019

(54) SYSTEM AND METHOD FOR ENCOURAGING USER ENGAGEMENT DURING A PRESENTATION

(71) Applicant: salesforce.com, inc., San Francisco, CA (US)

(72) Inventor: Pooja Deopura, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 263 days.

(21) Appl. No.: 15/200,594

(22) Filed: Jul. 1, 2016

(65) Prior Publication Data
US 2018/0007150 A1     Jan. 4, 2018

(51) Int. Cl.
| | | |
|---|---|---|
| *G06F 15/16* | (2006.01) | |
| *G06F 17/30* | (2006.01) | |
| *H04L 29/08* | (2006.01) | |
| *G06Q 30/02* | (2012.01) | |
| *H04W 4/23* | (2018.01) | |

(52) U.S. Cl.
CPC ... *G06F 17/30899* (2013.01); *G06Q 30/0201* (2013.01); *G06Q 30/0267* (2013.01); *H04L 67/22* (2013.01); *H04W 4/23* (2018.02)

(58) Field of Classification Search
CPC .......... G06Q 30/0201; G06Q 30/0267; G06Q 30/0277; G06F 17/30899
USPC ....................................................... 709/217
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

*Primary Examiner* — Kyung H Shin
(74) *Attorney, Agent, or Firm* — Lorenz & Kopf, LLP

(57) ABSTRACT

Systems and methods are provided for encouraging user engagement during a presentation to a group of users in attendance at a presentation. When presentation mode is enabled at a user system, the user system monitors its user input and output systems to determine whether any of the user input and output systems have been interacted with during the presentation mode. Each time a processing system of the user system determines that any of the user input and output systems have been interacted with during the presentation mode, it communicates a message to a server system, which computes, based on messages received from the user system, an engagement metric for a user of the user system. This engagement metric indicates a level of engagement of that user during the presentation.

17 Claims, 13 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,633,358 B2 * | 4/2017 | Kolowich .......... G06Q 30/0201 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian P et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon M T et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0088805 A1 * | 4/2007 | Cyster ............... G06F 17/30899 709/217 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0178784 A1 * | 6/2015 | Oliver ................ G06Q 30/0267 705/14.64 |

* cited by examiner

SYSTEM AND METHOD FOR ENCOURAGING USER ENGAGEMENT DURING A PRESENTATION

TECHNICAL FIELD

Embodiments of the subject matter described herein relate generally to monitoring usage of personal communication devices during a presentation, and, more particularly, to computer implemented methods, computer systems and applications for encouraging user engagement during a presentation.

BACKGROUND

In many enterprises today, there is an emphasis on keeping employees up-to-date on the latest developments in their field, and therefore employees are encouraged to attend many presentations on a regular basis. For instance, in technical companies, engineers need to stay updated on the latest technology developments within their company and within their technical field.

Traditionally, these presentations were live events that the employees had to attend in person, but today's employees have access to many different types of media. Presentations can be live streamed so that users can view them remotely in real time. Alternatively, presentations can be recorded so that users can view them at a later time using their smartphone or other computer.

During live presentations to a group of attendees, one issue that can arise is lack of engagement by members of the audience. Today nearly everyone has a smartphone, laptop or touchscreen tablet computer or other wireless communication device that they carry with them at all times. Some attendees have difficulty paying attention because they have trouble staying off their electronic devices while the presentation is taking place. This is not only distracting to the user of the electronic device, but to others around that user.

Another issue that arises is that many employees feel uncomfortable asking or answering questions during a presentation even though doing so would often benefit the entire audience.

It would be desirable to provide systems and methods that can help improve user engagement of attendees during a presentation.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

Systems and methods are provided for encouraging user engagement during a presentation to a group of users in attendance at a presentation. When presentation mode is enabled at a user system, the user system monitors its user input and output systems to determine whether any of the user input and output systems have been interacted with during the presentation mode. Each time a processing system of the user system determines that any of the user input and output systems have been interacted with during the presentation mode, it communicates a message to a server system, which computes, based on messages received from the user system, an engagement metric for a user of the user system. This engagement metric indicates a level of engagement of that user during the presentation.

Figure 1:
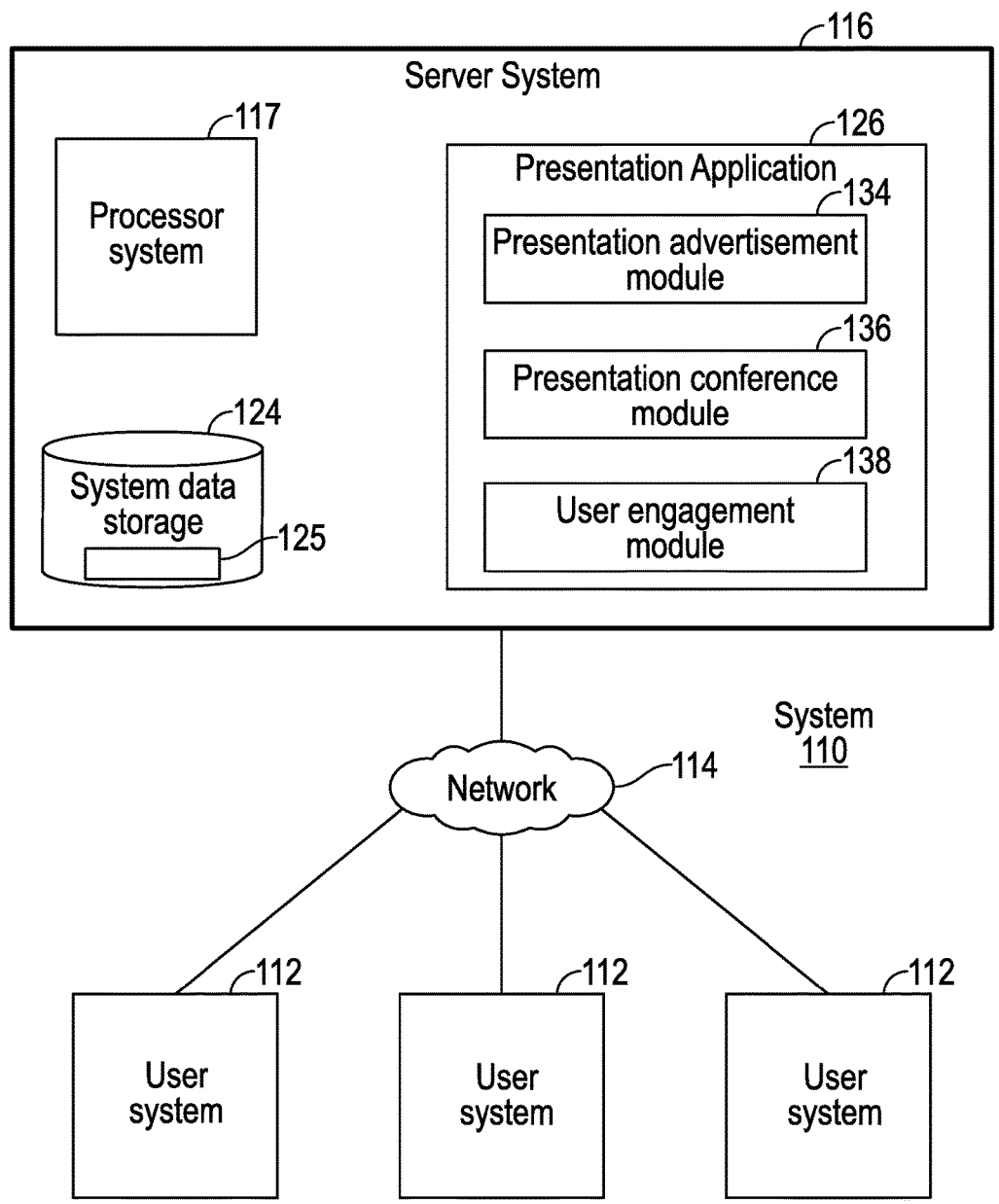
FIG. 1 illustrates a block diagram of an example system in which the disclosed embodiments may be implemented.

FIG. 1 illustrates a block diagram of an example system 110 in which the disclosed embodiments may be implemented. FIG. 1 and the following discussion are intended to provide a brief, general description of one non-limiting example of an example environment in which the embodiments described herein may be implemented. Those skilled in the art will appreciate that the embodiments described herein may be practiced with other computing environments.

System 110 may include user systems 112, a network 114, a server system system 116, a processor system 117, a presentation application 126, and system data storage 124 for storing system data 125. In other embodiments, system 110 may not have all of the components listed and/or may have other elements instead of, or in addition to, those listed above. For ease of illustration, FIG. 1 shows one block for each of the processor system 117 and system data storage 124. These blocks 117, 124 may represent multiple processor systems and system data storage units, respectively.

The user systems 112 are communicatively coupled to the server system 116 over the network 114. Each of the user systems 112 can be a cellular telephone, such as a smartphone, laptop computer, tablet computer, desktop personal computer, workstation, PDA, or any wireless access protocol (WAP) enabled device or any other computing device capable of interfacing directly or indirectly to the Internet or other network connection. In one embodiment, the server system 116 can be a cloud-based server system, and in one implementation, can be an on-demand database services system that implements a cloud platform.

The system data storage 124 includes a database for storing previously recorded presentations and associated materials. It serves as a repository of presentation recordings, and additional materials such as PowerPoint presentations, slide decks and documents that can provide users with easy access to a wide variety of materials. The system data storage 124 can also store information about each user including, for example, attendance credits for presentations, rewards earned for participation in presentations, etc.

The processor system 117 of server system 116 is configured to execute a presentation application 126 that provides various different functions via a presentation advertisement module 134 that advertises upcoming live presentations and prior recorded presentations, a presentation conference module 136 that allows users to interact during live presentations to provide feedback messages (e.g., comments, questions, responses to questions) via an enterprise social media website, and a user engagement module 138 performs various functions in conjunction with corresponding client-side functionality at user systems 112 to encourage user engagement during live presentations to a group of users in attendance at the presentation. The presentation advertisement module 134, the presentation conference module 136, and the user engagement module 138 will be described in greater detail below with reference to corresponding client-side functionality provided by one of the user systems 112.

Figure 2:
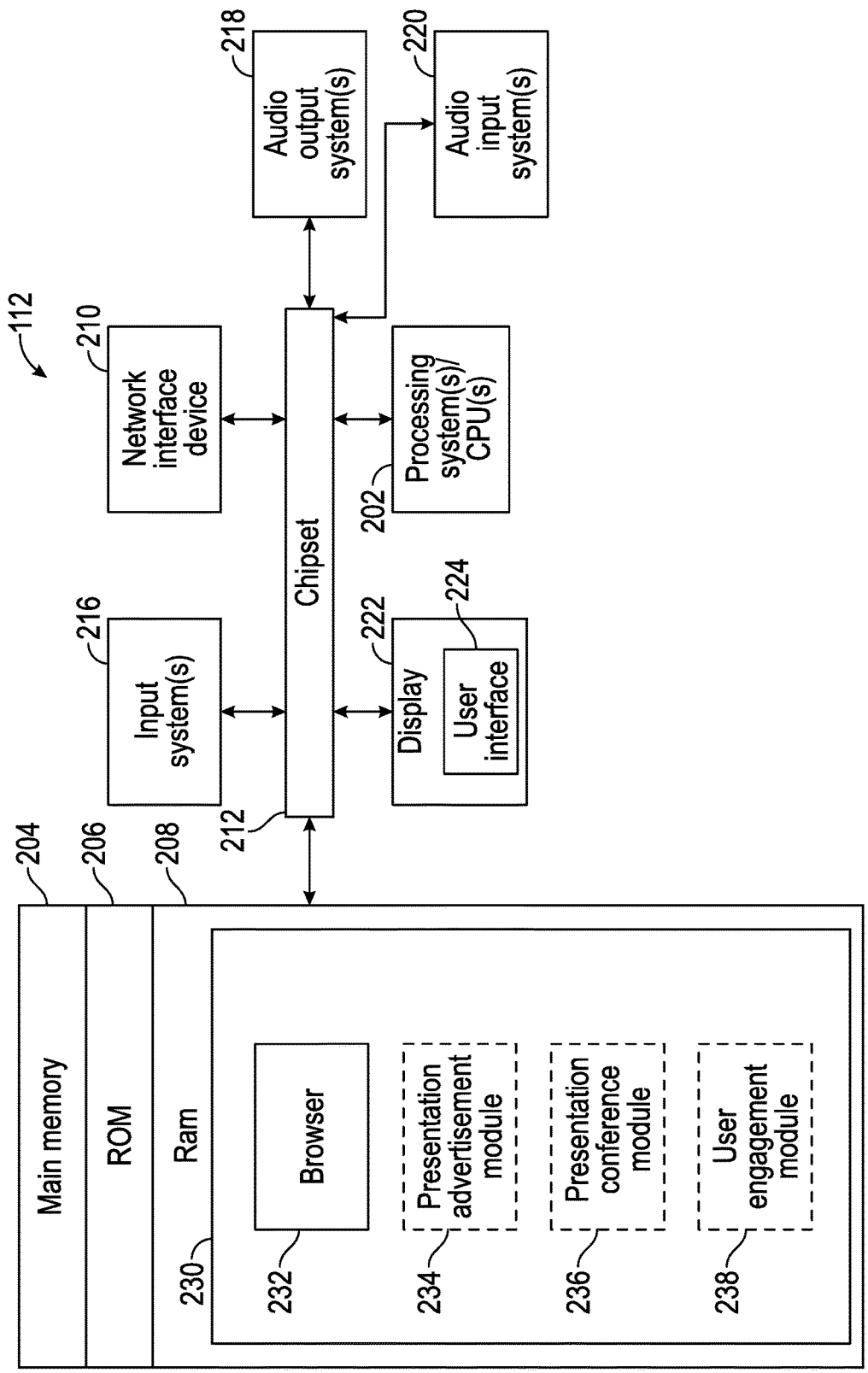
FIG. 2 is a schematic block diagram of a user system in accordance with an embodiment.

FIG. 2 is a schematic block diagram of a user system in accordance with an embodiment. FIG. 2 will be described with reference to FIG. 1. The user system 112 can include one or more processing system(s) 202, main memory 204, a network interface device (NID) 210, a chipset 212, input systems 216, and audio output systems 218, audio input systems 220, and a display 222 with a user interface 224. It will be appreciated that the user system 112 may not include all of the components shown in FIG. 2, may include other components that are not explicitly shown in FIG. 2, or may utilize an architecture completely different than that shown in FIG. 2.

The chipset 212 is usually located on a motherboard of the user system 112. The chipset 212 is a set of electronic components (e.g., in an integrated circuit) that interconnects and manages the data flow between the processing system(s) 202 and other elements of the user system 112 and any peripherals that are connected to the user system 112. For instance, the chipset 212 provides an interface between the processing system(s) 202 and the main memory 204, and also includes functionality for providing network connectivity through the NID 210, such as a gigabit Ethernet adapter. The chipset 212 typically contains the processor bus interface (also known as a front-side bus), memory controllers, bus controllers, I/O controllers, etc.

Processing system(s) 202 represents one or more general-purpose processing devices such as a microprocessor, central processing unit, or the like. More particularly, the processing system(s) 202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 202 may also be one or more special-purpose processing devices such as an application specific integrated circuit (ASIC), a field programmable gate array (FPGA), a digital signal processor (DSP), network processor, or the like.

The processing system(s) 202 can include one or more central processing units ("CPUs") that operate in conjunction with the chipset 212. The processing system(s) 202 perform arithmetic and logical operations necessary for the operation of the user system 112. The processing system(s) 202 can perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The NID 210 is capable of connecting the user system 112 to other computers over the network 114. The network 114 can be an Ethernet or Gigabyte Ethernet LAN, a fiber ring, a fiber star, wireless, optical, satellite, a WAN, a MAN, or any other network technology, topology, protocol, or combination thereof.

Input system(s) 216 (or input device(s)) allow the user to input information to the user system and can include things such as a keyboard, a mouse or other cursor pointing device, a pen, a webcam device, etc. Audio output system(s) 218 (or output device(s)) present information to the user of the user system and can include things such as speakers, or the like. Audio input system(s) 220 (or input device(s)) can include a voice input device and can include things such as microphones and associated electronics that are used by the user of the user system to input audio information. The display 222 and it's user interface 224 provide a touch screen that functions as both a touch input device and a visual output system. All of these systems/devices are well known in the art and need not be discussed at length here.

The chipset 212 can provide an interface to various forms of computer-readable storage media including a main memory 204 (e.g., read-only memory (ROM), flash memory, dynamic random access memory (DRAM) such as synchronous DRAM (SDRAM)), and hard disk. The hard disk is a form of non-volatile memory that stores operating system (OS) software that is copied into RAM and executed by the processing system(s) 202 to control the operation of the user system 112, manage computer hardware and software resources, and provide common services for computer programs executed by the processing system(s) 202. The operating system makes the different parts of the user system 112 work together. The processing system(s) 202 can communicate with the various forms for computer-readable storage media via the chipset 212 and appropriate buses.

The main memory 204 may be composed of many different types of memory components. The main memory 204 can include non-volatile memory (such as read-only memory (ROM) 206, flash memory, etc.), volatile memory (such as random access memory (RAM) 208), or some combination of the two. The RAM 208 can be any type of suitable random access memory including the various types of dynamic random access memory (DRAM) such as SDRAM, the various types of static RAM (SRAM). The main memory 204 (as well as the processing system(s) 202) may be distributed throughout the user system 112.

The ROM 206 of the main memory 204 can be used to store firmware that includes program code containing the basic routines that help to start up the user system 112 and to transfer information between elements within the user system 112. The ROM of the main memory 204 may also store other software components necessary for the operation of the user system 112.

The RAM 208 stores programs/instructions 230 or executable code for one or more programs that can be loaded and executed at processing system(s) 202 to perform various functions. The programs/instructions 230 are computer readable program code that can be stored in RAM 208 (or other a non-transitory computer readable medium of the user system 112) that can be read and executed by processing system(s) 202 to perform various acts, tasks, functions, and steps as described herein. A few non-limiting examples of programs/instructions 230 that are stored in the RAM 208 include a browser application 232 and a presentation advertisement module 234, a presentation conference module 236, and a user engagement module 238 in accordance with the embodiments described herein. The user system 112 can download the presentation advertisement module 234, the presentation conference module 236, and the user engagement module 238 as an application from a server (or online "store") and load it into RAM 208.

As is known in the art, the browser application 232 includes various functional modules including a user interface that includes a main window and various parts of the browser display such as the address bar, back/forward button, bookmarking menu etc., a browser engine which server as an interface for querying and manipulating one or more instances of rendering engine that is responsible for displaying the requested contents on a browser screen, a networking module used for network calls, a JavaScript Interpreter that is used to parse and execute the JavaScript code, user interface backend, a data storage or persistence layer that is used to save data, including cookies, on the hard disk, etc. When executed by the processing system(s) 202, the browser application 232 can be used for retrieving, presenting, and traversing information resources on the Internet. The browser application 232 brings information resources to the user ("retrieval" or "fetching"), allowing them to view the information ("display", "rendering"), and then access other information ("navigation", "following links"). An information resource is identified by a Uniform Resource Identifier (URI/URL) and may be a web page, image, video or other piece of content. Hyperlinks present in resources enable users easily to navigate to related resources.

The presentation advertisement module 234 corresponds to and interacts with the presentation advertisement module 134 of the server system 116. When executed by the processing system 202, the presentation advertisement module 234 can display information and content (via the user interface 224) regarding presentations. The information and content can include, for example, information and content regarding upcoming or past presentations that might be of interest to that user (e.g., based on user information that is associated with that user). There can be an option for smaller presentations that are shorter in duration. In addition, there is also action button that allows the user to connect to a social media feed that is associated with a particular presentation, where users can post comments and questions about that presentation and learn more about a particular presentation. Some examples will be described below with reference to FIGS. 4A-5.

In one embodiment, the presentation advertisement module 234 can generate and send out push notifications to the user systems 112 regarding upcoming or past presentations that might be of interest to that user. In one embodiment, the presentation advertisement module 234 can broadcast these push notifications to all of the user systems 112 so that all users are aware of upcoming or past presentations. In another embodiment, the presentation advertisement module 234 can send targeted push notifications to particular ones of the user systems 112 so that those users are made aware of upcoming or past presentations that might be of interest to them. For instance, the presentation advertisement module 234 can determine a particular group of users might be interested in a particular presentation, based on user information that is associated with that particular group of users, and send targeted push notifications to the user systems 112 associated with that particular group of users. This way not everyone in the organization will receive every push notification, but only those that are relevant to them based on their interests or background.

The presentation conference module 236 corresponds to and interacts with the presentation conference module 136 of the server system 116. For past presentations that have been recorded, the presentation conference module 236 allows the user can also submit feedback messages (e.g., comments, questions, answers) to a common forum such as a social media feed associated with that presentation. During live presentations, the presentation conference module 236 allows the user to join an interactive chat session during a presentation, and submit feedback messages (e.g., comments, questions, answers, submit poll responses, etc.) during the presentation to a common forum such as a social media feed or a chat room page established within an enterprise social network such that it is accessible by any other users within the same enterprise who are attending the presentation. This allows the users to interactively communicate in real-time regarding the presentation. Another benefit of allowing users to submit feedback messages (e.g., comments, questions, answers, submit poll responses, etc.) to a common forum, such as a social media feed, is that a permanent record is created that is saved for future users to review and learn from. This can allow future users to gain insight based on feedback provided by other users.

In one embodiment, the presentation conference module 236 can identify the user as a registered attendee of the presentation based on an identifier, and automatically grant the user system access privileges to connect the user to the common forum. This identifier can be any identification mechanism that confirms the user's identify. For example, the user could log into the presentation application 126 using a username and password. Alternatively, the user could present a credential to the administrator (such as an employee badge or other form of identification that gives the user clearance to attend the presentation), or could confirm a password or other access code with the administrator.

The user engagement module 238 corresponds to and interacts with the user engagement module 138 of the server system 116. The user engagement module 138 of the user system 112, and the user engagement module 238 of the server system 116 provide a system for encouraging user engagement during a presentation to a group of users in attendance.

Upon execution of the engagement module 238, the processing system 202 executes instructions to display a prompt via the user interface 224 to enable a presentation mode during a live presentation to a group of users. In one embodiment, the user of the user system 112 has to enable presentation mode at the user system 112 to receive attendance credit for attending the presentation. In one embodiment, the user engagement module 138 at the server system 116 only processes information received from the engagement module 238 during the presentation (e.g., received as soon as the presentation starts until it stops).

After the presentation mode is enabled, the processing system 202 of the user system 112 executes instructions to monitor it's input and output systems 216, 218, 222, 224 to determine whether any of the input and output systems 216, 218, 222, 224 have been interacted with (e.g., activated, enabled, used or interacted with in any way) during the presentation mode. For example, in one embodiment, the audio elements of the user system 112 can include one or more audio output elements (e.g., speaker), and the user input and output systems can also include a display 220 configured to display a user interface 224 that functions as both a touch-screen input device and a visual output device, as well as various buttons and controls. When the presentation mode is enabled, the processing system 202 can automatically place the audio elements 218 and the display 220 in an inactive state, or confirm that they are already in an inactive state, and then begin monitoring them to determine if the user has interacted with them during the presentation mode. For example, in one implementation, the processing system 202 can automatically cause the audio elements 218 of the user system to be disabled so that the user system 112 does not emit audible sound, and can close the user interface 224 of their user system (e.g., place it in an off state or low power state in which the display 220 is dimmed), and keep them off during the duration of the presentation. In another implementation, the processing system 202 can prompt the user to silence or mute or turn off the audio elements 218 of the user system so that the user system 112 does not emit audible sound, and to close the user interface 224 of their user system (e.g., off state or low power state in which the display 220 is dimmed), and keep them off during the duration of the presentation. Thus, in this example, the processing system 202 executes instructions to monitor the state of the audio elements 218 and monitor the state of the display 222 and its user interface 224 during the presentation mode to determine whether any of the audio elements or the display 222 have been used or interacted with (e.g., been turned on, activated, enabled, received an input signal, etc.) during the presentation mode.

The user of the user system 112 would have the option of enabling or turning the input and output systems of the user system back on after they are placed in their inactive states, but the goal is to discourage the user from doing so to improve user engagement during the presentation (for both the user and any other attendees of the presentation).

When an event is detected by the processing system 202 that indicates activation of or interaction with the user system 112 by the user, the processing system 202 generates a message (called an interaction message) that is sent, via the NID 210, to the server system 116. For example, each time the processing system 202 determines that any one of the user input and output systems 216, 218, 222, 224 of the user system 112 (e.g., one of the audio elements or display 222) has been interacted with during the presentation mode, the processing system 202 executes instructions to generate and communicate an interaction message to the server system 116.

Based on the interaction messages received from the user system 112 during the presentation, the user engagement module 138 of the server system 116 can compute an engagement metric for the user of the user system 112. The engagement metric has a value that indicates the user's level of engagement during the presentation. Many different techniques could be used to compute the engagement metric.

For example, in one embodiment, the number of interaction message received within a time period can be counted and if the number exceeds a threshold, then the engagement metric is decreased by a certain amount, and if the value of the engagement metric (at completion of the presentation) falls below another engagement threshold, then the user's engagement is deemed unacceptable for that presentation because the user was interacting with his/her user system too frequently during the presentation.

In some implementations, it is desirable for the user to interact during the presentation so long as the user's interaction relates to the presentation. For example, the user may want to submit a response to a question presented as part of presentation (e.g., by a presenter or moderator), or submit a question to the presenter via the server system 116. As such, in another embodiment, when computing the engagement metric for the user of the user system 112, the server system 116 is configured to decrease the value of the engagement metric for each interaction message received unless a feedback message is received from the user system 112 within a predetermined time after the interaction messages was received. For example, in one implementation, the server system 116 can start a timer each time an interaction messages is received and monitor for receipt of a feedback message from the user system before that timer expires. When a feedback message is received from the user system 112 prior to expiration of the timer, the interaction message can be disregarded during computation of the engagement metric, and the value of the engagement metric for the user of the user system can be increased when computing the engagement metric. This way the server system 112 can increase the engagement metric each time the user posts a comment to the other attendees (e.g., answers a question that was presented to the attendees, or asks a question to the presenter, etc.). User interactions with his/her user system 112 for those purposes will not decrease the engagement metric.

During the presentation, the user engagement module 138 of the server system 116 can determine whether the current, computed value of the engagement metric is less than a first engagement threshold, and if so, can send a warning message to the user system 112 that indicates that if interaction with their user system 112 persists, the user will be asked to leave the presentation, and if the value of the engagement metric decreases even further below the first engagement threshold, a dismissal message can be sent to the user indicating that the user is requested to leave the site where the presentation is being given so that the user does not distract others during the presentation.

After the presentation has concluded and the final value of the engagement metric has been computed, the user engagement module 138 of the server system 116 can determine whether a value of the engagement metric is less than the first engagement threshold, and if so, can send a notice message to the user system 112 that indicates that attendance credit for the presentation will not be given to that user. By contrast, when the value of the engagement metric is determined to be greater than or equal to the first engagement threshold, the user engagement module 138 of the server system 116 can create a record giving an attendance credit to the user. Conditioning attendance credits in this way provides an incentive for user engagement by the user during the presentation.

To identify users who are outstanding participants during the presentation, the user engagement module 138 can then determine whether a value of the engagement metric is greater than or equal to a second engagement threshold (that is greater than the first engagement threshold), and when the value of the engagement metric is determined to be greater than or equal to the second engagement threshold, the user engagement module 138 can issue a reward to the user. This reward can be displayed in the form of an icon (e.g., badge) on a social media web site of the enterprise so that it is viewable by other users including those who attended the presentation. This provides yet another, higher-level incentive for user engagement. Other incentives can also be provided based on excellence in user engagement over multiple presentations. For example, when a user earns a certain number of rewards that have been issued to that user for their engagement during different presentations the user engagement module 138 can enter the user into a drawing for a bigger prize, such as a gift certificate, lunch with their manager, or any other form of monetary or non-monetary reward. An added benefit of making rewards publicly visible to others within the learning community is that it allows all users to gauge how engaged a particular user is within their community. The higher the engagement rewards count/metric is, the more likely it is that this user is more knowledgeable about what the learning community is talking about, focusing on, and thereby a good person to reach out to for questions. It can allow users to identify other users who are likely to have expertise in a particular subject matter area when trying to learn more about a particular topic or have questions answered. For instance, in a company who has many engineers that all have expertise in different areas, the disclosed embodiments can allow a user to find those engineers who are likely to have expertise in a particular subject matter. By contrast, users who have a low engagement rewards count/metric are less likely to have expertise in that learning community or within a particular subject matter area, and therefore would likely be less preferred users to reach out to when a user is attempting to learn more about a particular subject matter.

Prior to describing further details of the user engagement module 138 of the server system 116 (FIG. 1) and the user engagement module 238 of the user system 112 (FIG. 2) with reference to FIGS. 6-8, some examples of different pages that are provided via the presentation application will now be described below in greater detail with reference to FIGS. 3-5.

Figure 3:
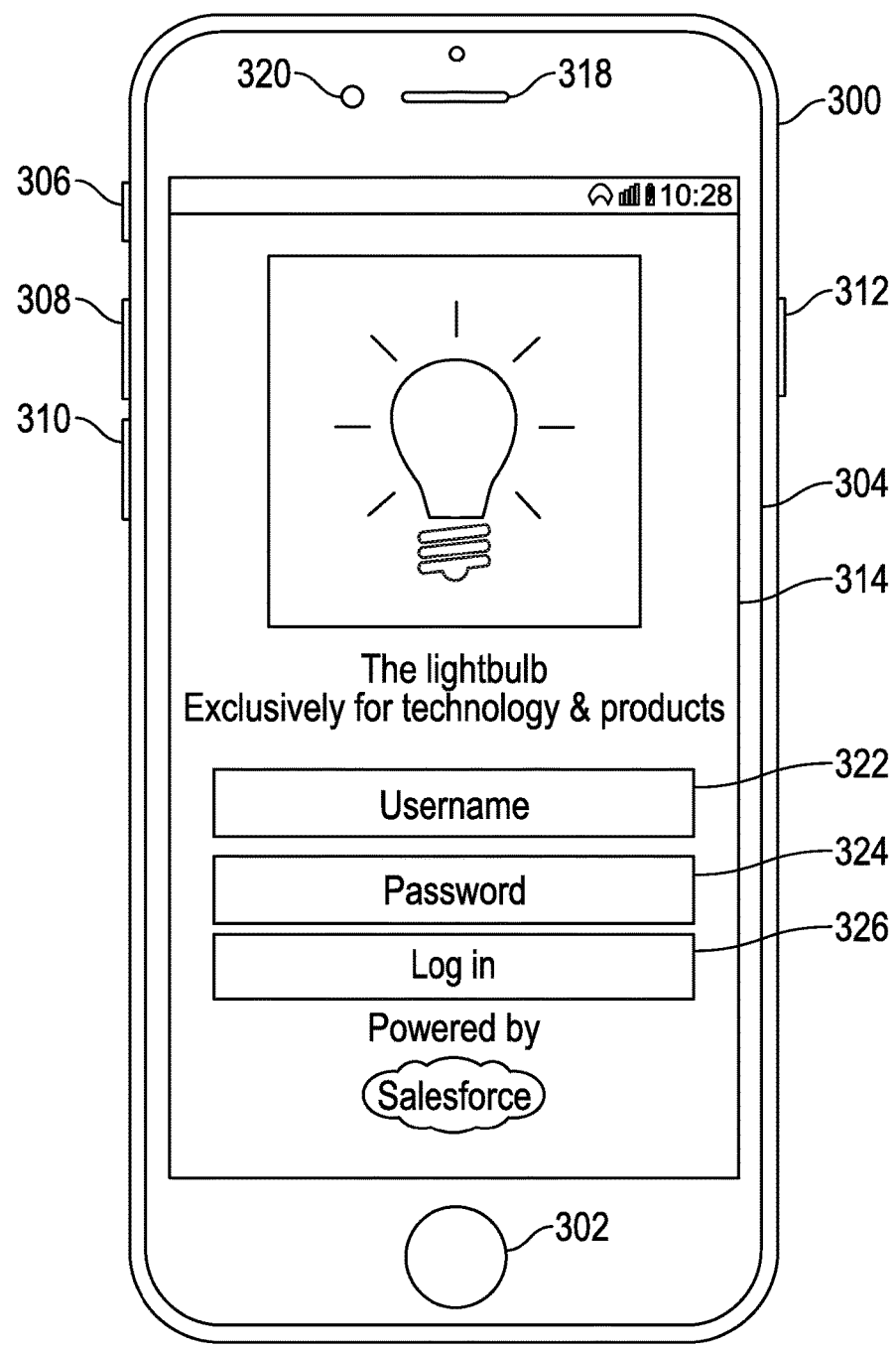
FIG. 3 is an example of a login page that can be displayed on a display of the user system to initially log into the presentation application in accordance with an embodiment.

FIG. 3 is an example of a login page that can be displayed on a display 304 of the user system 112 to initially log into the presentation application in accordance with an embodiment. FIG. 3 shows a non-limiting implementation of a screen that can be displayed via the user interface 224 when a user attempts to login into the presentation application 126. In this example, the user system 112 is a smartphone 300 that includes a display control button 302, a display 304, an audio control button 306 that can be used to enable or disable audio output devices such as speakers 318, a volume control button 308 that can be used to increase volume of the audio output devices, a volume control button 310 that can be used to decrease volume of the audio output devices, and a display control button 312 that can be used to enable or disable the display 304, and a camera 320. The display 304 displays a user interface 314 that includes a field 322 to enter a username, a field 324 to enter a password, and a login button 326. After the user inputs his/her username and password, the user can press the login button 326, and if authentication is successful, the presentation application opens and user of the user system 112 can interact with the presentation application 126.

The server system 116 can send the user system 112 an identifier when the server system 116 confirms that the user is permitted to access the presentation application, access stored presentations, and attend live presentations. In one embodiment, after successful authentication and authorization with the server system 116, the server system 116 issues an identifier to the user system 112, such as a cookie, that can be stored and used later to establish that the user system 112 has successful authenticated with the presentation application 126 at the server system 116. This identifier can be a file (e.g., a text string, access key, password, etc.) that is sent by the presentation application 126 to the user system 112 after successfully logging in. The identifier can include information about the user system, and may optionally store login information for that user that for later use so that the next time a user attempts to access the presentation application, the user system 112 can automatically send the this identifier back to the presentation application 126 without having to login. For example, in one embodiment, when the user system wants to open the presentation application 126, the user can select an icon that is displayed on the user interface to open the presentation application 126. This helps eliminate the need for the user to login to the server system 116 each time the user wants to use the presentation application 126 (e.g., user can login without requiring a user of the user system to manually enter information to login into and authenticate with the server system 116).

Figure 4A:
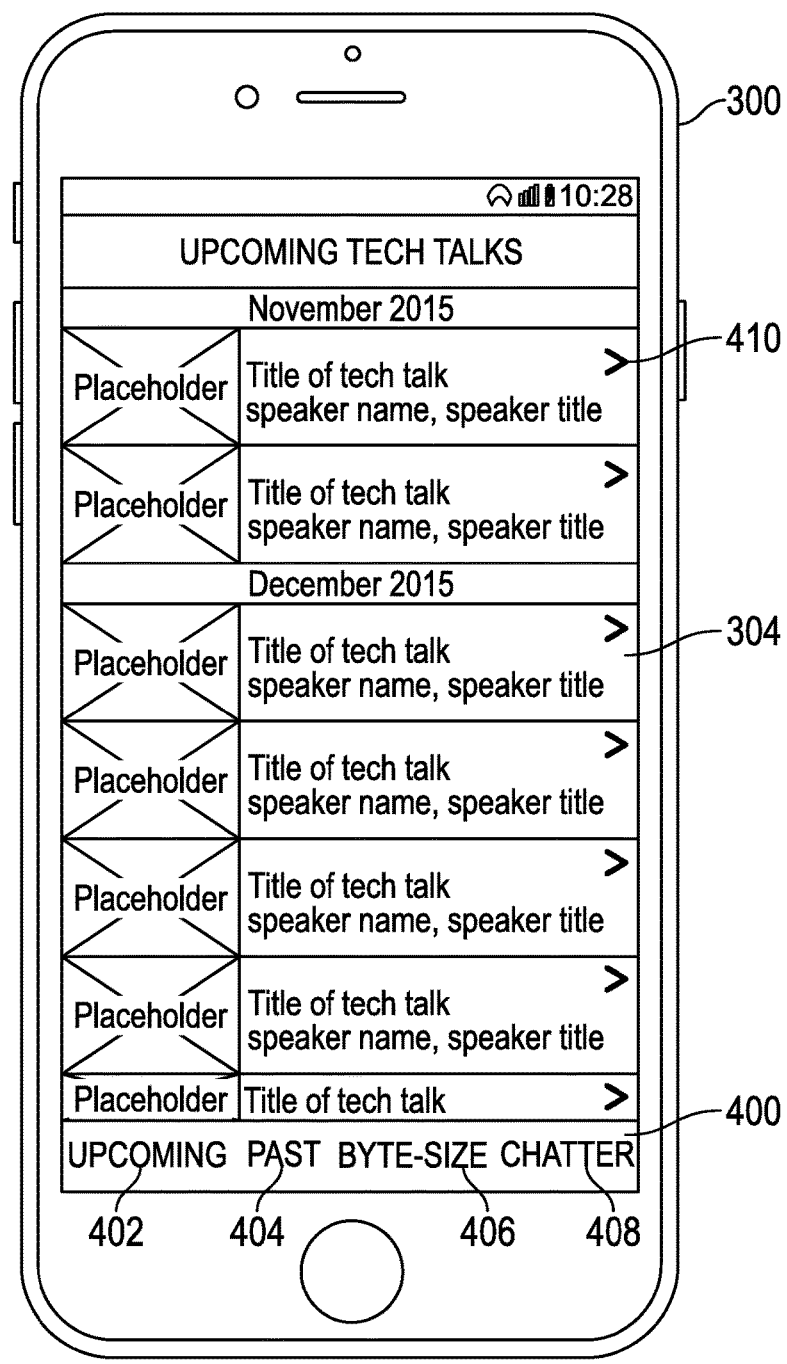
FIG. 4A is an example of a page that can be displayed on a display of the user system that shows information and content regarding upcoming presentations that might be of interest to a user in accordance with an embodiment.

FIG. 4A is an example of a page that can be displayed on a display 304 of the user system 300 that shows information and content regarding upcoming presentations that might be of interest to a user in accordance with an embodiment. The page includes a tab bar 400 that includes tabs for upcoming presentations 402, past presentations 404, byte size presentations 406, and a link 408 to a social media site of the enterprise. This page of FIG. 4A can be displayed when the user of the user system 300 selects the UPCOMING tab 402 of the tab bar. In one implementation, a list of upcoming presentations is displayed that is ordered by date in descending order starting with the next presentation that is scheduled. In one implementation, the presentation advertisement module 134 of the server system 116 selects particular presentations that might be of interest to that particular user based on user information that is associated with that particular user. This user information can be any details about the particular user such as areas of interest, job description or role within the enterprise, groups that the user belongs to within the enterprise, key words or preferences specified by the particular user, etc.

Information regarding each presentation, such as a placeholder for an icon, picture or video link, the title of the presentation, the speaker name(s), speaker title(s), etc. can be displayed to give the user a quick overview about that presentation. If the user is interested in learning more about that presentation, the user can select a page navigation control element 410 (>) that opens a new page that includes more details about that specific presentation such a brief audio or video summary regarding purpose, scope or content of the presentation, a written summary of the presentation and what it is about, links to presentation materials such as PowerPoint presentations or supporting documents, a written summary or biography of the speaker, a number of attendees who are planning to attend the presentation, or any other information that clarifies what the presentation is about, etc. In addition, links or buttons can be included that, when selected, automatically allow the user to register for the presentation. The user can select an option so that the user will be sent regular reminders as the date of the presentation approaches. For instance, in one implementation, an action button (e.g., a star button) is displayed that allows the user to flag any upcoming (or past) presentations that the user is interested in, which trigger follow-up reminders.

For example, for upcoming presentations that have not yet occurred, selecting the action button will schedule reminders that are sent to the user (e.g., via e-mail, a pop-up window on the device, etc.) as the presentation approaches so that the user is reminded to attend the presentation (either live or virtually online). Similarly, for past presentations that have occurred and been recorded and stored in a database, selecting the action button will schedule reminders that are sent to the user (e.g., via e-mail, a pop-up window on the device, etc.) that the presentation is available so that the user is reminded to view/listen to a recording of the presentation. In either case the reminders can be sent indefinitely unless the user chooses to dismiss the reminders in the event that the presentation is no longer of interest.

Although not illustrated in FIG. 4A, when the user selects the PAST tab 404, a similar page can be displayed that provides a list of past presentations that can be ordered by date in descending order starting with the most recent presentation that was added. The information regarding each past presentation can be the same except that the placeholder serves as a link to video and/or audio of the actual presentation, and additional information can be included such as a rating of that presentation, etc. In this regard, the presentation advertisement module 234 can also display a page (not shown) via the user interface 224 that includes presentation advertising information regarding prior presentations that might be of interest to that user. This presentation advertising information can include summary information about the rating scores for each of the prior presentations. The presentation advertisement module 234 can select prior presentations (that are to be included as part of the presentation advertising information) for a particular user based on user information that is associated with that particular user. This user information includes details about the particular user that are used to determine which prior presentations might be of interest to that particular user. For instance, in one implementation, a matching algorithm uses details about the user and matches them to keywords associated with the prior presentation to generate suggestions for selected ones of the prior presentations that might be of interest to that particular user.

One special class of past presentations are referred to as "byte-size" presentations. These byte-size presentations are generally shorter in duration and allow users to quickly view a presentation on a targeted, specific topic.

Figure 4B:
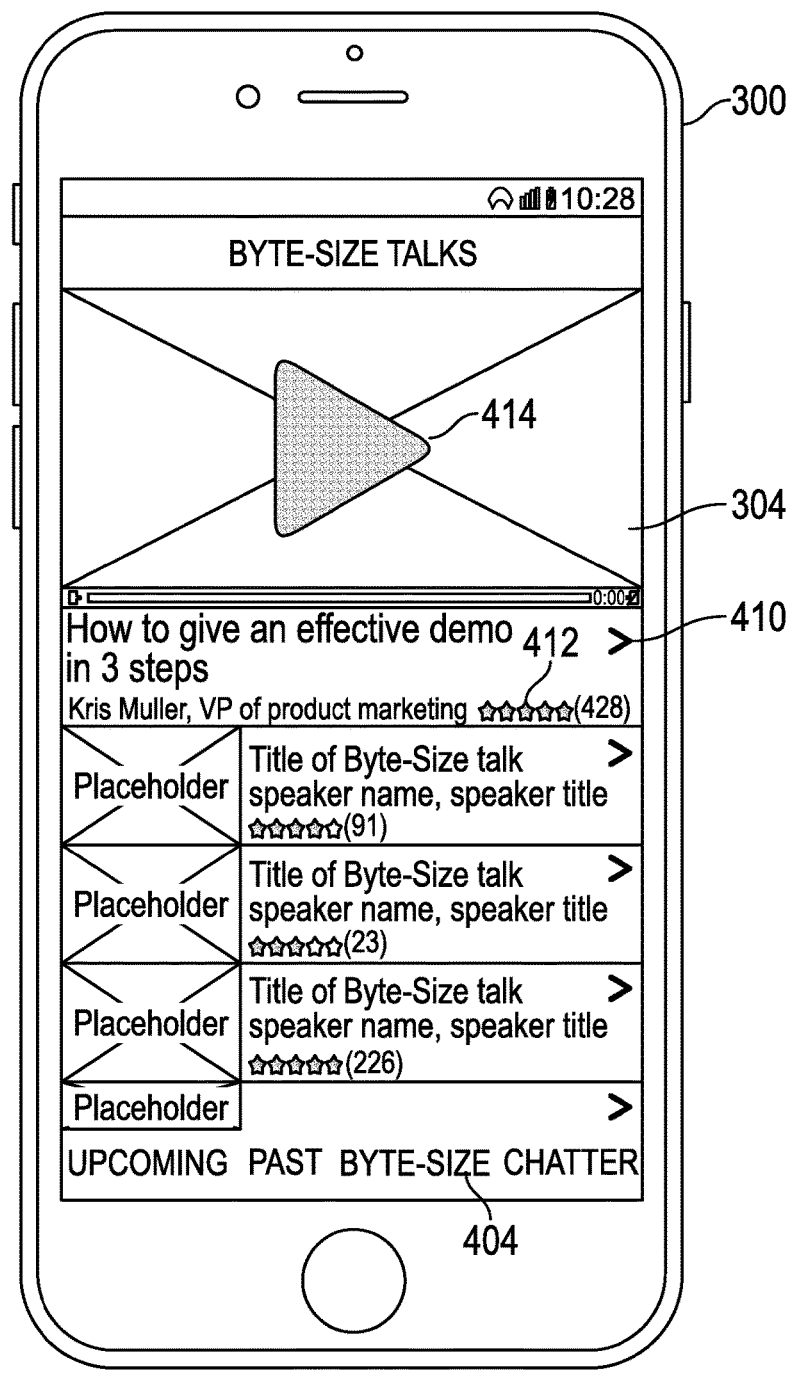
FIG. 4B is an example of a page that can be displayed on a display of the user system that shows information and content regarding byte-size presentations that might be of interest to a user in accordance with an embodiment.

FIG. 4B is an example of a page that can be displayed on a display 304 of the user system 300 that shows information and content regarding byte-size presentations that might be of interest to a user in accordance with an embodiment. This page of FIG. 4B can be displayed when the user of the user system 300 selects the BYTE-SIZE tab 404 of the tab bar. In one implementation, a list of byte-size presentations is displayed that is ordered by date in descending order starting with the most recent presentation that is available. In one implementation, the presentation advertisement module 134 of the server system 116 selects particular byte-size presentations that might be of interest to that particular user based on user information that is associated with that particular user.

Information regarding each byte-size presentation, such as a placeholder icon 414 that serves as a video link, the title of the presentation, the speaker name(s), speaker title(s), rating 412 of the presentation based on feedback by other users, etc. can be displayed to give the user a quick overview about that presentation. The user can simply select the placeholder icon 414 to start playback of that byte-size presentation on the display 304.

Figure 4C:
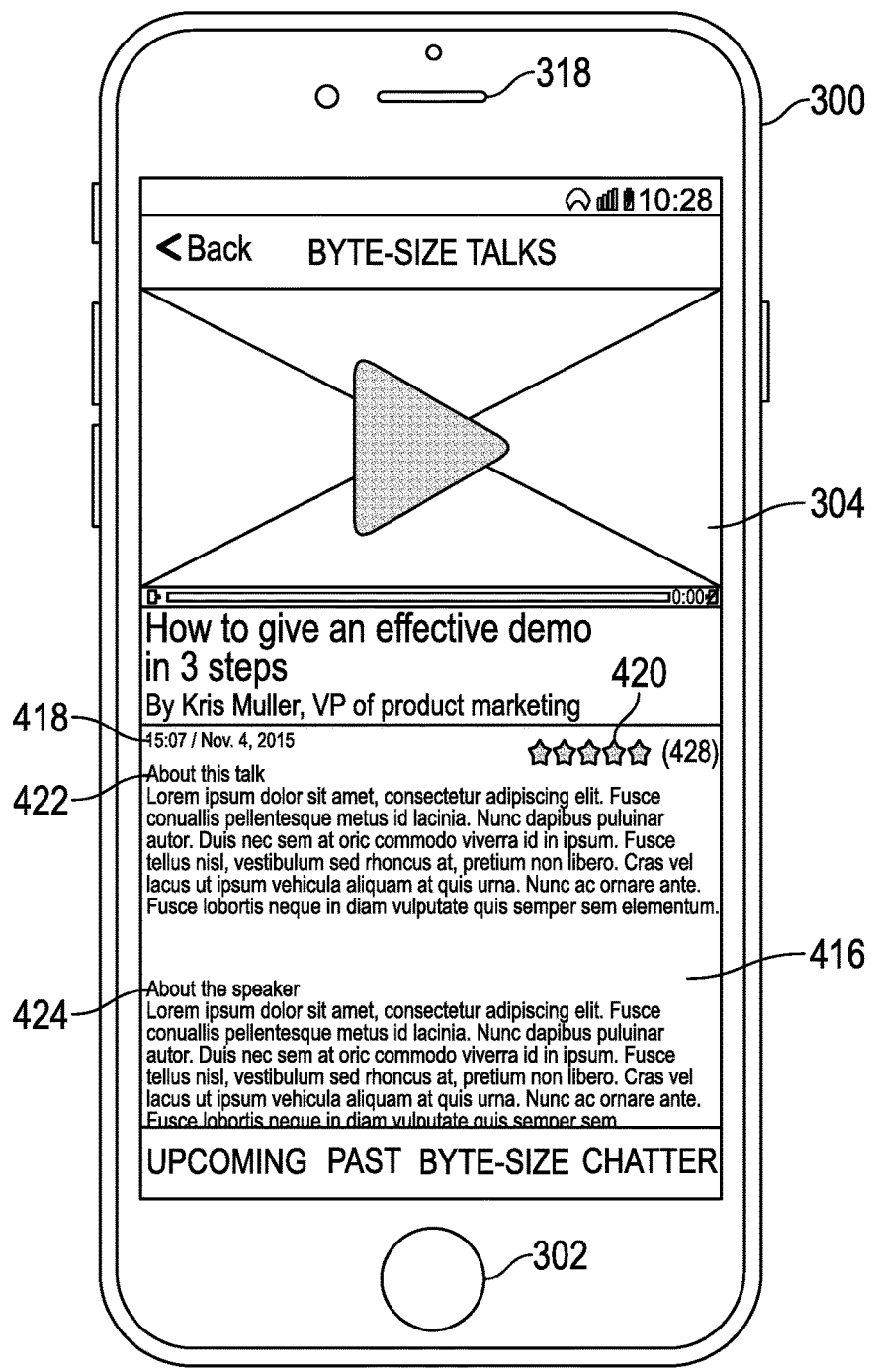
FIG. 4C is an example of a page that can be displayed on a display of the user system that shows additional information and content regarding a particular byte-size presentation in accordance with an embodiment.

FIG. 4C is an example of a page that can be displayed on a display 304 of the user system 300 that shows additional information and content regarding a particular byte-size presentation in accordance with an embodiment. The page of FIG. 4C can be displayed when the user of the user system 300 selects a page navigation control element 410 (>) of FIG. 4B to open a new page so that the user can learn more about the particular byte-size presentation before viewing it. The page of FIG. 4C can include all of the same information included in FIG. 4B, and can also include a panel 416 with more details about that specific byte-size presentation. In the particular example in FIG. 4C, these additional details in the panel 416 area include information such as date and time 418 of the original version of the byte-size presentation, the user rating 420 of the byte-size presentation and number of users who rated the presentation, a written summary of the presentation 422 (e.g., that gives more detail regarding what it is about), and a written summary or biography of the speaker 424; however, these examples are non-limiting and any other information about the presentation could also be included, such as, a brief audio or video summary regarding purpose, scope or content of the presentation, links to presentation materials such as PowerPoint presentations or supporting documents, a total number of attendees and viewers who have attended or watched the presentation, etc.

Figure 4D:
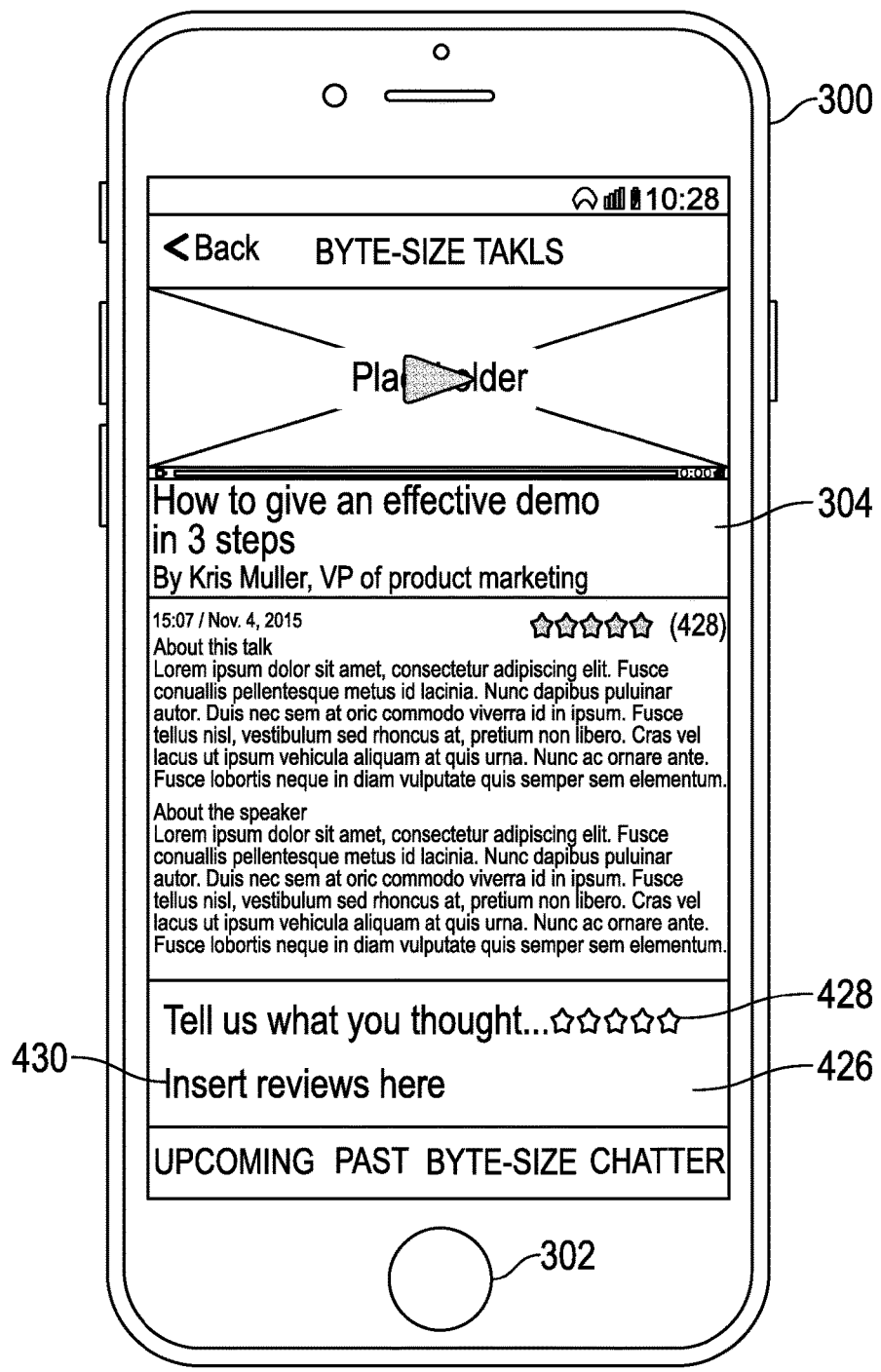
FIG. 4D is an example of a page that can be displayed on a display of the user system that shows a panel for rating and reviewing a presentation after the user had viewed it in accordance with an embodiment.

After the user has viewed or attended the presentation, it is helpful to presenters and other viewers if they have user feedback regarding the presentation. FIG. 4D is an example of a page that can be displayed on a display 304 of the user system 300 that shows a panel 426 for rating and reviewing a presentation (of FIG. 4C) after the user had viewed it in accordance with an embodiment. The page of FIG. 4D can be displayed after the user of the user system 300 has completed viewing of a particular byte-size presentation. In this particular example, the panel 426 includes a star rating widget 428 that allows the user to rank the presentation from one to five stars, and a field 430 where the user and insert a review and comments on the presentation.

In more general terms, with respect to ratings, the display 304 of the user system 300 can display via the user interface, after the presentation has concluded, a prompt that allows each user (who attended the presentation) to provide feedback regarding the presentation. In one embodiment, each user who has completed the presentation can submit a rating score for the presentation, and submit any comments, questions or any other feedback they have about the presentation. The rating score allows attendees to rate the presentation (e.g., from 1-5 stars). The presentation application 116 at server system 116 can then collect the rating scores for each presentation from all of the attendees who submit one, and publish summary information about the rating scores including one or more of: an average rating score, the rating score distribution, and number of occurrences for each rating score.

This feedback from attendees is valuable to both the speakers/presenters, and any prospective users who are considering whether to view and/or listen to a recorded version of the presentation: For listeners who missed the presentation, it can help them decide if it is worthwhile, and also prioritize it among other presentations that they may be considering. For speakers/presenters, it can help provide them with a better understanding of what the listeners thought of their presentation (e.g., what worked, what didn't work) so that they can use that feedback to ultimately produce better quality presentations.

Figure 5:
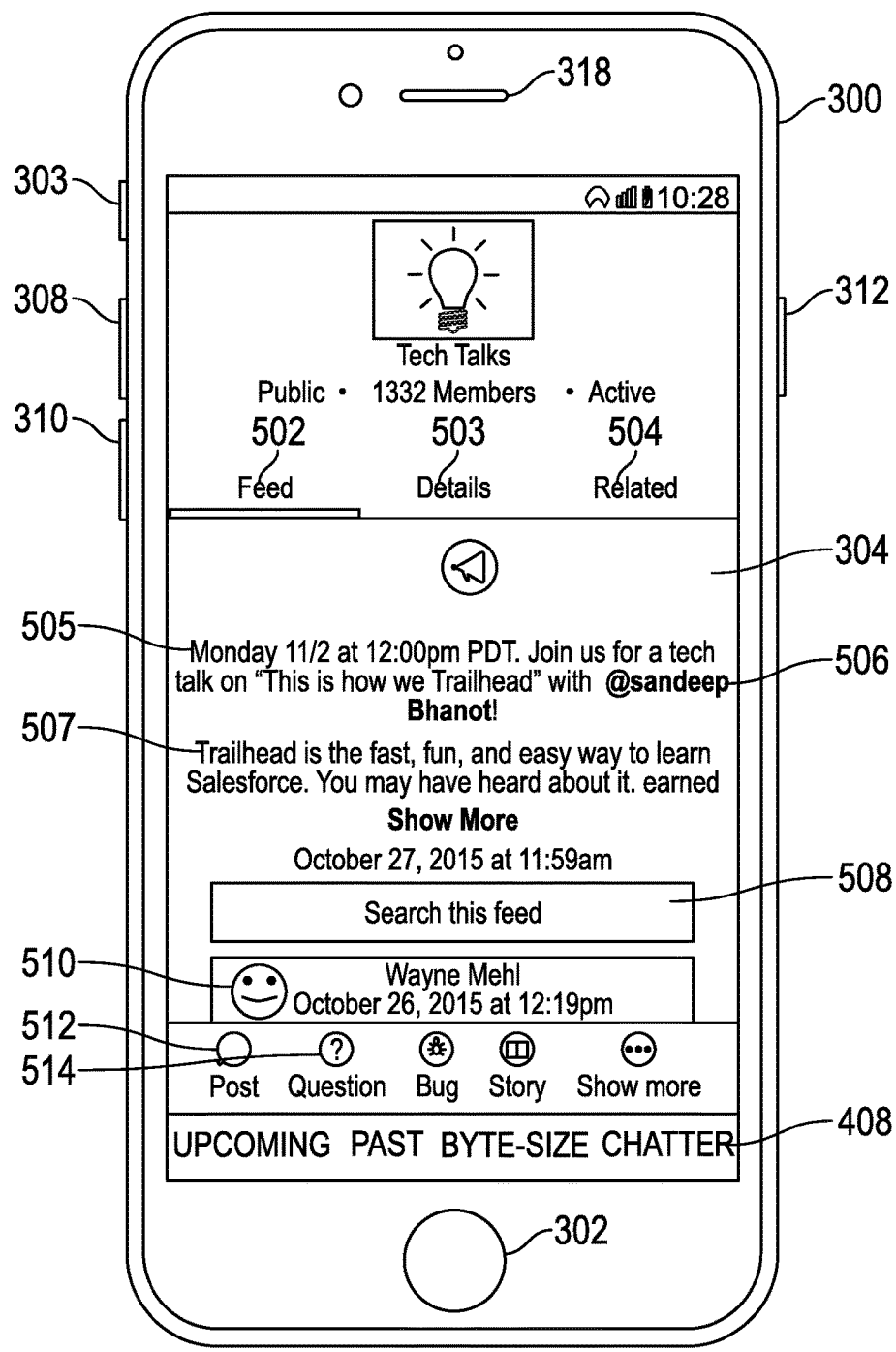
FIG. 5 is an example of a page that can be displayed on a display of the user system that shows a social media feed that is used to present information and content about presentations in accordance with an embodiment.

FIG. 5 is an example of a page that can be displayed on a display 304 of the user system 300 that shows a social media feed that is used to present information and content about presentations. The page includes a tab bar 400 that includes tabs (as described above with respect to FIG. 4A). The page of FIG. 5 can be displayed when the user of the user system 300 selects the tab 408 of the tab bar, which is a link 408 to a social media site of the enterprise. The format of the social media feed is different than the pages in FIGS. 4A through 4D, but includes some of the same information. In this implementation, segmented controls for a feed 502, details 503 and related 504 are included near the top of the page. The segmented controls can be used to display different types of information about a presentation. The feed control 502 is selected in FIG. 5, and displays a panel that includes information regarding the date and time 505 of the upcoming presentation, the title of the presentation and the presenter's name(s) 506, a brief summary 507 of what the presentation is about including the time that the brief summary was written. The panel also includes a search bar 508 that accepts text input by the user and searches the feed for matching text, a comments section 510 where users can post comments or questions to the feed using the post action button 512, or submit questions using the question action button 514. These features can allows users can post comments and questions about that presentation and learn more about a particular presentation If the details control 503 were selected, a different panel would be displayed that would include additional details about the upcoming presentation such as a brief audio or video summary regarding purpose, scope or content of the presentation, a written summary of the presentation and what it is about, links to presentation materials such as PowerPoint presentations or supporting documents, a written summary or biography of the speaker, a number of attendees who are planning to attend the presentation, or any other information that clarifies what the presentation is about, etc.

If the related control 504 were selected, a different panel would be displayed that would include information related to the upcoming presentation, such as links to other presentations that are related to the same or similar topics, links or buttons that allow the user to obtain additional information about the topic of the presentation, a link to the speaker's page within the social media website.

Further details of the user engagement module 138 of the server system 116 (FIG. 1) and the user engagement module 238 of the user system 112 (FIG. 2), and the various functions performed by each will now be described below in greater detail with reference to FIGS. 6-8.

Figure 6:
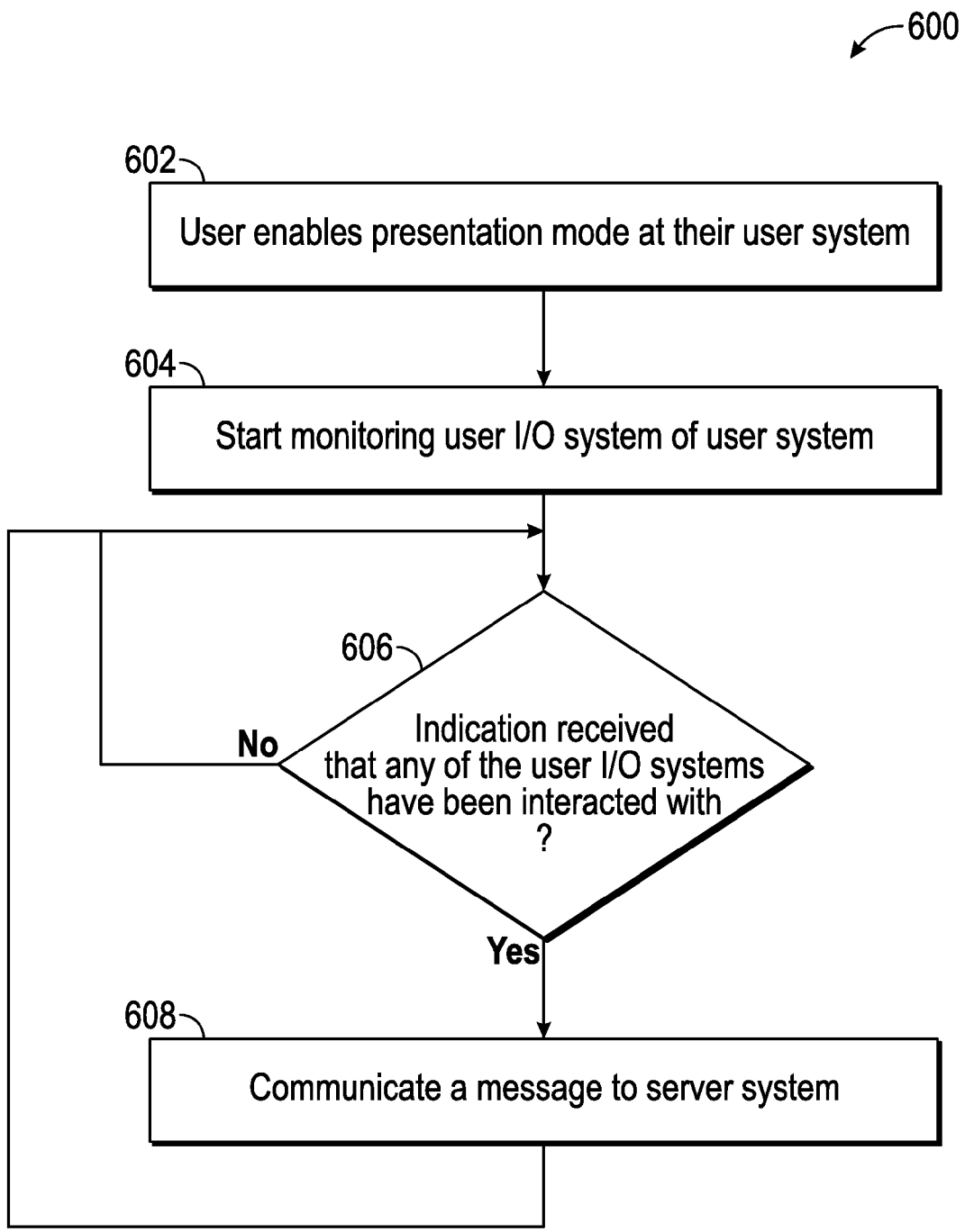
FIG. 6 is a flow diagram of an exemplary method performed by a user system when a user enables presentation mode at the user system in accordance with an embodiment.
Figure 7:
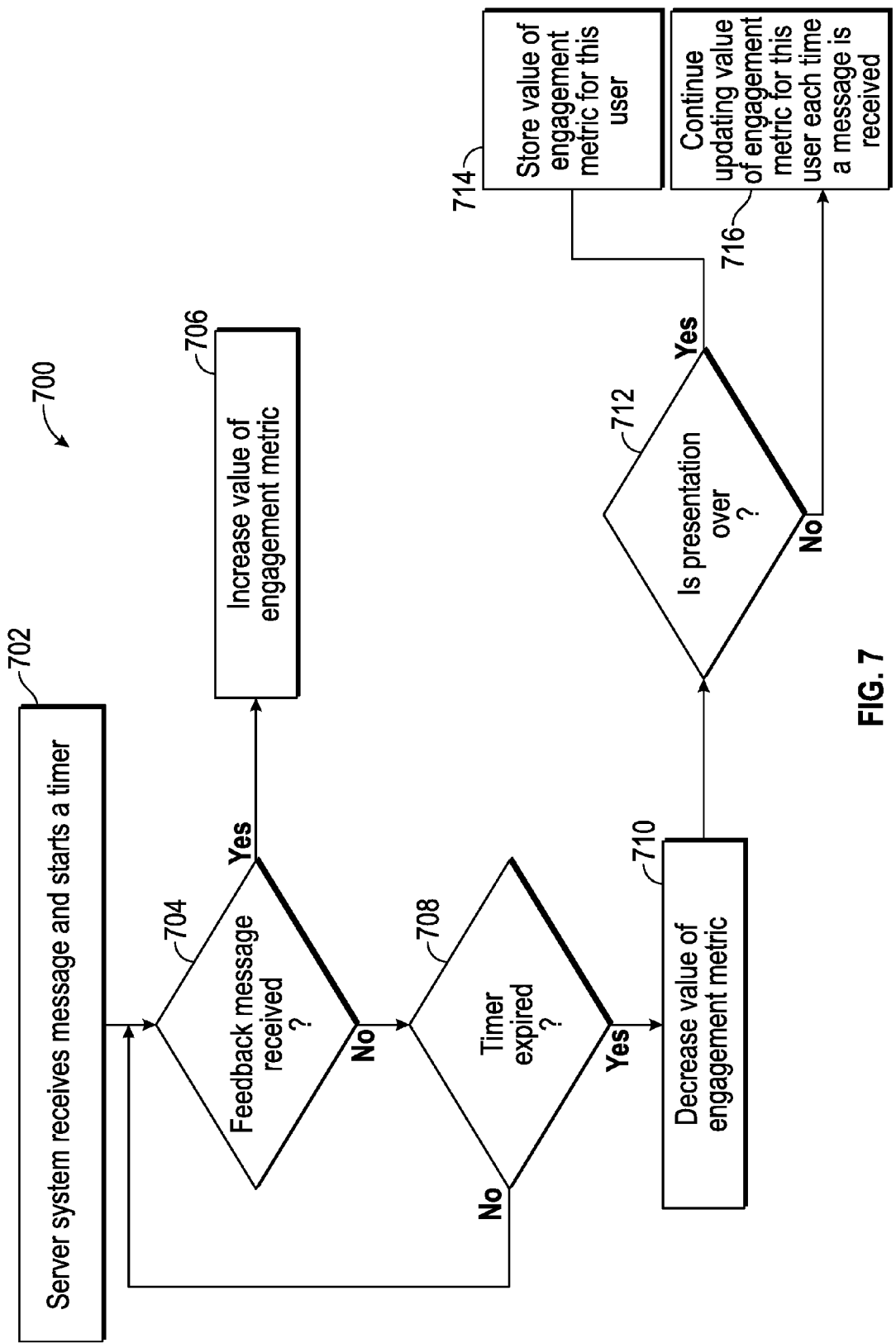
FIG. 7 is a flow diagram of an exemplary method performed by a server system for computing an engagement metric based on information received from the user system in accordance with an embodiment.
Figure 8:
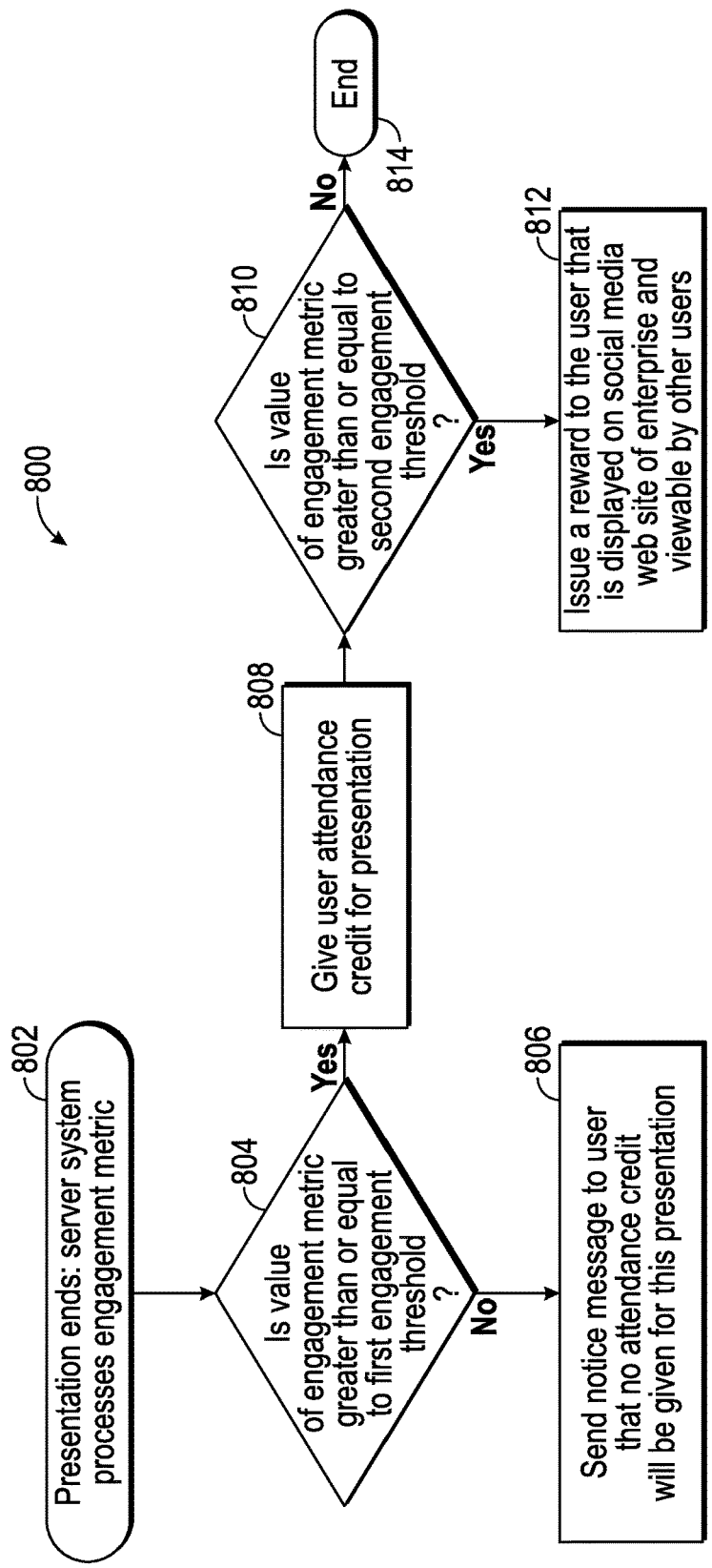
FIG. 8 is a flow diagram of an exemplary method, performed by a server system, for providing feedback to a user regarding that user's engagement during a presentation in accordance with an embodiment.

FIGS. 6-8 collectively illustrate different parts of a method for encouraging user engagement during a presentation to a group of users in accordance with an embodiment. As a preliminary matter, it should be understood that steps of the methods 600, 700, 800 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated methods 600, 700, 800 can be stopped at any time. In certain embodiments, some or all steps of this process, and/or substantially equivalent steps, are performed by execution of processor-readable instructions stored or included on a processor-readable medium, for example. For instance, in the description of FIG. 6 that follows, the user system 112 will be described as performing various acts, tasks or steps, but it should be appreciated that this refers to the processing system(s) 202 of the user system 112 executing instructions to perform those various acts, tasks or steps. Furthermore, in the description of FIG. 7, it will be understood that any actions described as being performed by the user are performed by the user interacting with the user system 112. Likewise, in the description of FIGS. 7 and 8 that follow, the server system 112 will be described as performing various acts, tasks or steps, but it should be appreciated that this refers to the processor system 117 executing instructions to perform those various acts, tasks or steps. Depending on the implementation, the processor system 117 can be centrally located, or distributed among a number of server systems that work together. FIGS. 6-8 will be described below with reference to FIGS. 1 and 2.

FIG. 6 is a flow diagram of an exemplary method 600 performed by a user system when a user enables a presentation mode at the user system in accordance with an embodiment. The method 600 begins at 602, where a prompt is displayed via a user interface 222 of a user system to enable a presentation mode during a presentation to a group of users, and a user input is made to enable presentation mode at the user system 112. In one embodiment, this presentation mode runs only during presentation such that communication of interaction messages by a user engagement module 238 of the user system 112 to the user engagement module of the server system 116 takes place only during the course of the presentation (e.g., while the presentation is occurring) so that user interactions that take place outside of the presentation are not considered by the user engagement module of the server system 116 when computing an engagement metric (FIG. 7) for that user.

After the presentation mode is enabled, at 604, a processing system 202 of the user system 112 begins monitoring the user input and output systems of the user system 112 to determine (at 606) whether any of the user input and output systems of have been interacted with during the presentation mode. As noted above, the user input and output systems can include audio elements 216, 218 of the user system, a display 220 and the user interface 222 displayed via the display 220, etc. For example, in one embodiment, the processing system 202 of the user system 112 can confirm that the audio elements are in an inactive state at the start of presentation mode, and then determine whether any of the audio elements have been interacted with during the presentation mode. The processing system 202 of the user system 112 can also automatically place the display 220 in an inactive state at the start of presentation mode, and then monitor a state of the display 220 during the presentation mode to determine whether the display 220 has been interacted with during the presentation mode.

Each time the processing system 202 of the user system 112 determines (at 606) that any of the user input and output systems has been interacted with during the presentation mode, it generates an interaction message that is communicated to the server system 116 via the network interface device 210. For instance, the processing system 202 can execute instructions to communicate an interaction message to the server system 116 each time one of the audio elements 216, 218 or the display 220 is determined to have been interacted with during the presentation mode. Each interaction message indicates that the user has interacted with the user system 112.

The server system can determine that the user is interacting with the user system 112 during the presentation based on the interaction messages that are received. In many cases, user interaction with the user system 112 can be interpreted as a lack of user engagement because if the user is interacting with the user system 112 it can mean that the user is preoccupied with other things and not focused on the presentation. Examples can include the user using the user system 112 to do things such as text message, view social media or other websites, check e-mail accounts, or other common activities that a user would use their device for. However, this may not be true in all circumstances. In some cases, the user might actually be interacting with the user system 112 (via the user input and output systems of the user system 112) to provide some type of interactive feedback regarding the presentation. This type of interaction is beneficial and actually encouraged. As such, it is desirable to have methods for computing an engagement metric based on information received from the user system including the interaction messages and other feedback information.

FIG. 7 is a flow diagram of an exemplary method 700 performed by a server system for computing an engagement metric based on information received from the user system in accordance with an embodiment. As will now be described below with reference to FIG. 7, the server system 116 can then process each of the interaction messages received from the user system 112 to compute, based on the interaction messages, an engagement metric for the user of the user system 112. The engagement metric has a value that indicates the user's level of engagement during the presentation. At the start of the presentation, the engagement metric has a base or starting value that can increase or decrease based on certain events. In this particular embodiment, receipt of an interaction message by the server system 116 will decrease the value of the engagement metric unless the server system 116 receives some type of feedback message from the user system 112 within a certain time period after the interaction message was received, and if such a feedback message is received within the time period the value of the engagement metric can be increased. The method 700 of FIG. 7 represents one exemplary implementation, but other methods could be used to compute an engagement metric.

Preliminarily, it is noted that steps 702 through 714 of the method 700 (FIG. 7) show the processing of a single interaction message received by the server system 116, but the steps 702 through 714 of the method 700 can be performed for each interaction message received during the presentation.

The method 700 beings at 702 when an interaction message is received at the server system 116, and the server system 116 starts a timer associated with that particular interaction message. The server system 116 starts a timer each time an interaction message is received, and then monitors for receipt of a feedback message from the user system prior to expiration of the timer. This timer is applicable to that particular interaction message only, and a new timer is associated with each interaction message that is received by the server system 116.

At 704, the server system 116 determines whether a feedback message has been received. When the server system 116 determines (at 704) that a feedback message has not been received, the method 700 proceeds to 708, where the server system 116 determines whether the timer has expired. When the server system 116 determines (at 708) that the timer has not expired, the method loops back to 704.

When the server system 116 determines (at 708) that the timer has expired, the method proceeds to 710, where the server system 116 decreases the value of the engagement metric. Therefore, when the server system 116 does not receive a feedback message from the user system prior to expiration of the timer, then the user's interaction with the user system 116 (as indicated by the interaction message) is interpreted as a lack of user engagement (or "negative" user engagement), and a value of the user's engagement metric will decreased to reflect this lack of user engagement. In essence, the server system 116 will decrease the value of the engagement metric each time the server system 116 receives an interaction message from the user system 112 unless a feedback message is received from the user system 112 within a predetermined time (per the timer) after that particular interaction message was received.

In one embodiment, at any point following 702, the server system 116 can generate and send out a warning notification message to the user system 112 to warn that particular user that the server system 116 has detected interaction with the user system 112, and that the particular user should cease such interaction to avoid losing attendance credit. In one implementation, the server system 116 can generate and send out a warning notification message to the user system 112 at 702, whereas in another implementation, the server system 116 can generate and send out a warning notification message to the user system 112 at 710. In other implementations, the server system 116 can generate and send out the warning notification message to the user system 112 at any point in between 702 and 710. This warning notification message puts the particular user on notice that they should stop using the user system 112 during the presentation if they want to receive attendance credit.

When the server system 116 determines (at 704) that a feedback message has been received, the method 700 proceeds to 706, where the server system 116 increases the value of the engagement metric for the user of the user system. Thus, when the server system 116 does receive a feedback message (e.g., submission of a comment or question, a response to a question, answer to a poll, etc.) from the user system 116 prior to expiration of the timer, then the user's interaction with the user system 116 (as indicated by the interaction message) is interpreted as positive interaction or user engagement, and a value of the user's engagement metric will increased (at 706) to reflect this positive user engagement. The impact of the interaction message on computation of the engagement metric is effectively disregarded so long as a feedback message is received prior to expiration of the timer.

Following either 706 or 710, the server system 116 can check to determine whether the presentation is over. When the server system 116 determines (at 712) that the presentation is over, at 714 the server system 116 can store the current value of the engagement metric for this user as the final value of the engagement metric for this user for this presentation. When the server system 116 determines (at 712) that the presentation is not over, at 716 the server system 116 can continue to process any other interaction messages and/or feedback messages received (per 702-410), and continue updating the current value of the engagement metric for this user each time a new interaction message and/or feedback message is received until a determination is made (at 712) that the presentation is over.

FIG. 8 is a flow diagram of an exemplary method 800, performed by a server system, for providing feedback to a user regarding that user's engagement during a presentation in accordance with an embodiment. Method 800 begins at 802 when the presentation ends, and the server system 116 processes the engagement metric (from 714). At 804, the server system 116 determines whether the value of the engagement metric is greater than or equal to a first engagement threshold.

When the value of the engagement metric is less than the first engagement threshold, at 806 the server system 116 sends a notice message to the user system 112 that indicates that the user will not be given an attendance credit for the presentation. In other words, just because a user is present at the presentation, this does not necessarily mean that the user will be given attendance credit. When the value of the engagement metric is less than the first engagement threshold, this means that the user's interaction with the user system 112 during the presentation was too excessive, which can mean that the user was not paying attention to the presentation and/or could have been distracting other users who were in attendance due to excessive use of the user system 112 during the presentation. Therefore, in an effort to encourage better user engagement, the user is penalized by not granting the user attendance credit.

When the value of the engagement metric is greater than or equal to the first engagement threshold, at 808 the server system 116 creates a record giving an attendance credit to the user, and may optionally send a confirmation message to the user system 112 that indicates that the user will be given an attendance credit for the presentation. In some embodiments, at 808, the server system 116 can also issue a reward to the user when the server system 116 determines that the value of the engagement metric is greater than or equal to the first engagement threshold. By contrast, in other embodiments that will now be described with reference to 810 and 812, the server system 116 can issue a reward to the user when it determines that the value of the engagement metric is greater than or equal to a second engagement threshold that is greater than the first engagement threshold.

Step 810 is optional and can be implemented in some embodiments to make it more difficult for a user to earn the reward. At 810, the server system 116 can determine whether the value of the engagement metric is greater than or equal to a second engagement threshold that is greater than the first engagement threshold. When the server system 116 determines (at 810) that the value of the engagement metric is less than the second engagement threshold, the method 800 ends at 814.

When the server system 116 determines (at 810) that the value of the engagement metric is greater than or equal to a second engagement threshold, at 812, the server system 116 can issue a reward to the user. In one embodiment, the reward can be a badge or other credential that is posted and displayed on the user's social media profile on a social media web site of an enterprise that the user is part of. The badge indicates that the user attended and completed the presentation, and is viewable by other users in the enterprise who have access to the user's social media profile including those who attended the presentation. This badge serves as an incentive for the user to remain as engaged as possible during the presentation so that they can earn a badge.

For instance, in one non-limiting, exemplary implementation, if an initial engagement metric is 1.0, and the engagement metric is decreased by 0.05 for each interaction message (that is not disregarded due to feedback messages), and the first engagement threshold is 0.9 and the second engagement threshold is 0.95, then the user would be given attendance credit for the presentation if he/she has an engagement metric of 0.9 or greater, and would be issued a reward if he/she has an engagement metric of 0.95 or greater. Therefore, if two or fewer interaction messages are received by the server system 116 during the presentation (and not disregarded due to feedback messages), then the user would be given attendance credit for the presentation because the engagement metric would be greater than or equal to the first engagement threshold. However, if three or more interaction messages are received by the server system 116 during the presentation (and not disregarded due to feedback messages), then the user would not be given attendance credit for the presentation because the engagement metric is less than the first engagement threshold.

Similarly, if one or fewer interaction messages are received by the server system 116 during the presentation (and not disregarded due to feedback messages), then the user would be issued a reward for the presentation because the engagement metric would be equal to the second engagement threshold. However, if two or more interaction messages are received by the server system 116 during the presentation (and not disregarded due to feedback messages), then the user would not be issued a reward for the presentation because the engagement metric is less than the second engagement threshold.

In some embodiments, the second engagement threshold can be set so that the reward will be issued only to those users who were active participants in the presentation. For instance, if an initial engagement metric is 1.0, and the engagement metric is decreased by 0.05 for each interaction message (that is not disregarded due to feedback messages) and increased by 0.05 for each feedback message, the second engagement threshold can be set at 1.25, such that the user would be issued a reward if he/she has an engagement metric of 1.25 or greater, meaning that the user's participation during the presentation was exceptional because the user's number of feedback messages exceeded a threshold number of feedback responses.

In one embodiment, the influence of each user across can be tracked and displayed on their social media profile. A user's influence can be represented using any combination of a number of rewards received, a number of presentations that the user was given attendance credit for, a number of presentation-related posts made by that user, a number of likes received for presentation-related posts made by that user, a number of comments received in response to presentation-related posts made by that user, a number of times the user's presentation-related posts were shared by other users, etc.

Figure 9:
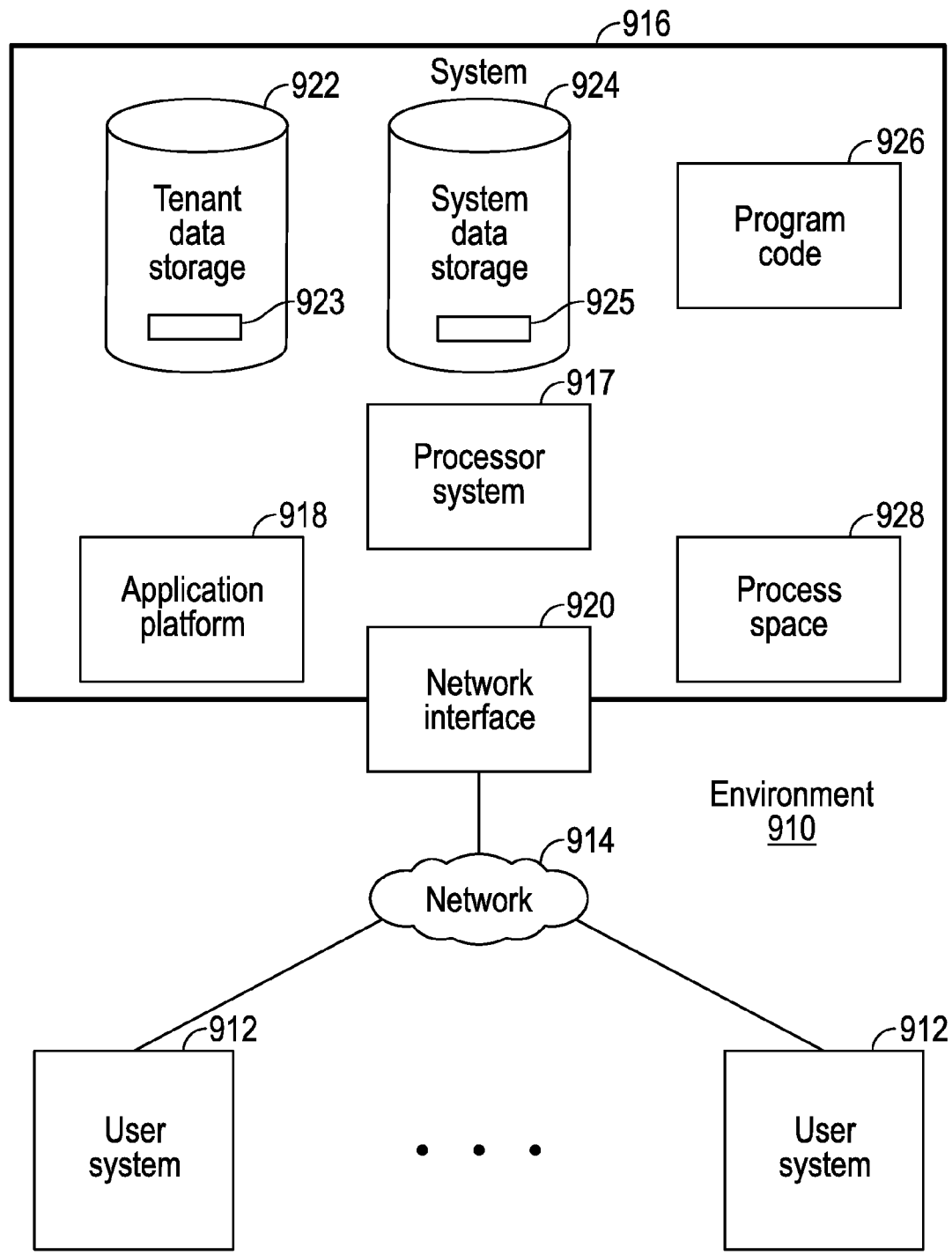
FIG. 9 illustrates a block diagram of an example environment that may be used to implement the embodiments described herein.

FIG. 9 illustrates a block diagram of an example environment 910 where a database service might be used, and which may be used to implement the embodiments described herein. Environment 910 may include user systems 912, network 914, system 916, processor system 917, application platform 918, network interface 920, tenant data storage 922, system data storage 924, program code 926, and process space 928. In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in FIG. 9 (and in more detail in FIG. 10) user systems 912 might interact via a network 914 with an on-demand database service, which is system 916. System 916 may also be referred to as a cloud service provider. System 916 provides its resources to customers (e.g., end users) as a service.

An on-demand database service, such as system 916, is a database system that is made available to outside users who do not need to necessarily be concerned with building and/or maintaining the database system, but instead may be available for more general use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, system 916 may include an application platform 918 that enables creating, managing, and executing one or more applications developed for an on-demand database service, for users accessing the on-demand database service via user systems 912, or for third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global internetwork of networks often referred to as the "Internet" with a capital "I." That network will be used in many of the examples herein. However, it should be understood that the networks used with the embodiment described herein use are not so limited, although TCP/IP is a frequently implemented protocol.

User systems 912 might communicate with system 916 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as to provide related data, code, forms, webpages and other information to and from user systems 912. The application servers are also configured to store to, and retrieve from, a database system related data, objects, and Webpage content. With a multi-tenant system, data for multiple tenants may be stored in the same physical database object. Tenant data may be arranged such that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party application developer) software applications, which may or may not include CRM, may be supported by the application platform 918, which manages the creation and storage of the applications into one or more database objects, and executing of the applications in a virtual machine in the process space of the system 916. The terms "application," "software application," "software package," "software code," and "program code" are used interchangeably.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could be a cellular telephone, such as a smartphone, laptop computer, tablet computer, desktop personal computer, workstation, PDA, or any wireless access protocol (WAP) enabled device or any other computing device capable of interfacing directly or indirectly to the Internet or other network connection. User system 912 typically runs an HTTP client, e.g., a browsing program, such as Google's Chrome browser, Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 916 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
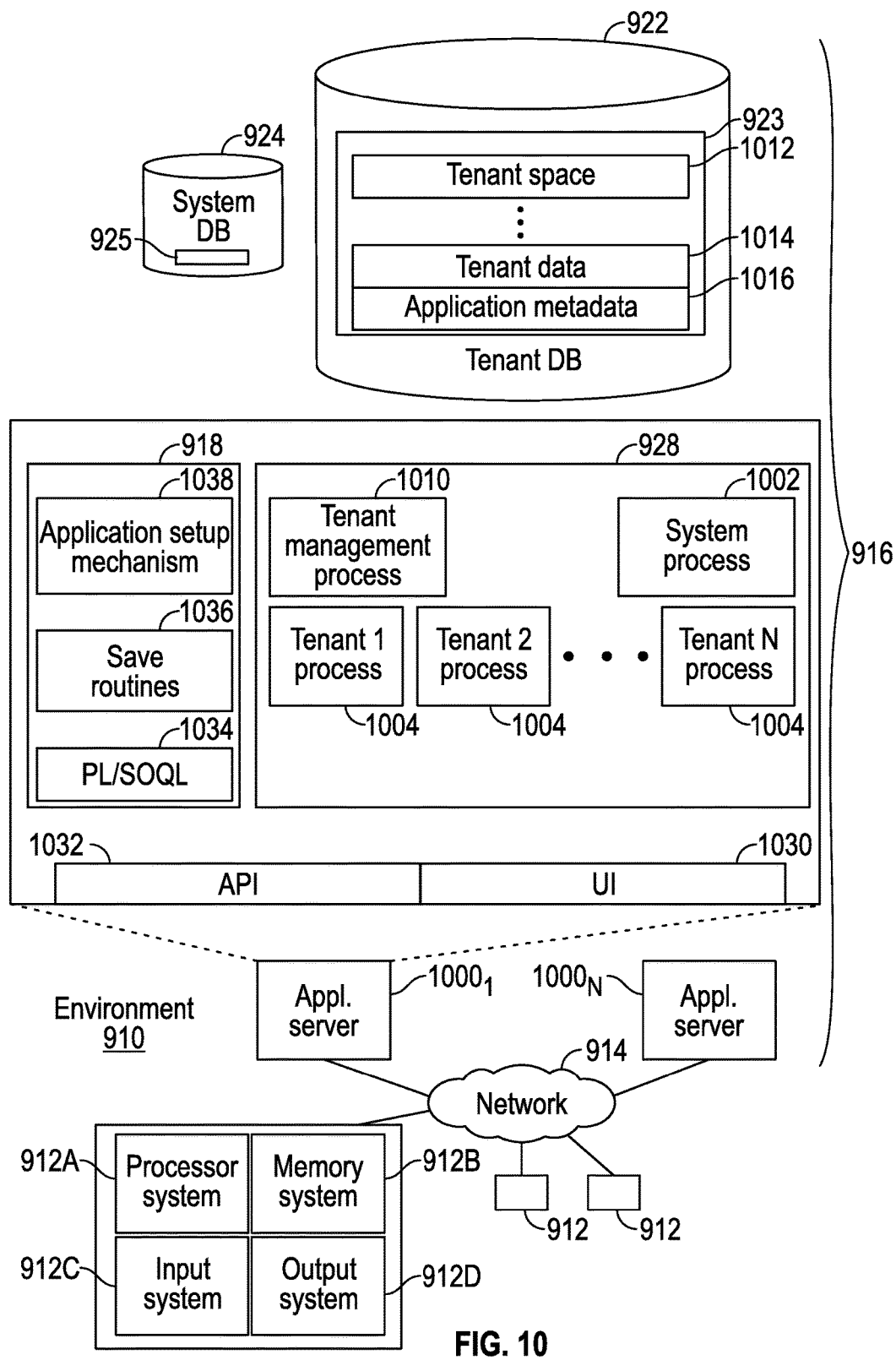
FIG. 10 illustrates a block diagram of another example environment, which may be used to implement the embodiments described herein.

FIG. 10 illustrates a block diagram of another example environment 910, which may be used to implement the embodiments described herein. Some of the elements in FIG. 10 overlap with those in FIG. 9, and therefore FIG. 10 will be described with reference to FIG. 9, and common numbering will be used for elements in FIG. 10 that are shown in FIG. 9. FIG. 10 also illustrates elements of system 916 and various interconnections, according to one embodiment. FIG. 10 shows that user system 912 may include processor system 912A (analogous to processing system(s) 202 in FIG. 2), memory system 912B (analogous to main memory 204 in FIG. 2), input system 912C (analogous to input system(s) 216 in FIG. 2), and output system 912D (analogous to audio output system(s) 218 and display 222 in FIG. 2). FIG. 10 shows network 914 and system 916. FIG. 10 also shows that system 916 may include tenant data storage 922, tenant data 923, system data storage 924, system data 925, user interface (UI) 1030, application program interface (API) 1032, PL/Salesforce.com object query language (PL/SOQL) 1034, save routines 1036, application setup mechanism 1038, applications servers $1000_1$-$1000_N$, system process space 1002, tenant process spaces 1004, tenant management process space 1010, tenant storage area 1012, user storage for tenant data 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown in FIG. 9, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to access tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes and to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010, for example. Invocations to such applications may be coded using PL/SOQL 1034 that provides a programming language style interface extension to API 1032. Invocations to applications may be detected by one or more system processes, which manage retrieving application metadata 1016 for the subscriber, making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer control protocol and Internet protocol (TCP/IP) are typical protocols for communicating between application servers 1000 and the database system. However, it will be apparent to one skilled in the art that other transport protocols may be used to optimize the system depending on the network connection used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles the storage of, and access to, different objects, data and applications across disparate users and organizations.

As an example of storage, one tenant might be a company that employs a sales force where each salesperson uses system 916 to manage his or her sales process. Thus, a user might maintain contact data, leads data, customer follow-up data, performance data, goals and progress data, etc., all applicable to that user's personal sales process (e.g., in tenant data storage 922). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more structured query language (SQL) statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the embodiments described herein. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor," "processor system," or "processing system" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," " in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A method for encouraging user engagement during a presentation to a group of users, the method comprising:
   monitoring, after a presentation mode is enabled at a user system, user input and output systems of the user system to determine whether any of the user input and output systems have been interacted with during the presentation mode;
   communicating a message to a server system each time a processing system of the user system determines that any of the user input and output systems have been interacted with during the presentation mode; and
   computing, at the server system, based on messages received from the user system, an engagement metric for a user of the user system that indicates a level of engagement of that user during the presentation;
   determining, at the server system after the presentation has concluded, whether a value of the engagement metric is less than a first engagement threshold;
   creating, at the server system when the value of the engagement metric is determined to be greater than or equal to the first engagement threshold, a record giving an attendance credit to the user for completing the presentation;
   determining, the server system when the value of the engagement metric is determined to be greater than or equal to the first engagement threshold, whether a value of the engagement metric is greater than or equal to a second engagement threshold, where the second engagement threshold that is greater than the first engagement threshold; and
   issuing, at the server system when the value of the engagement metric is determined to be greater than or equal to the second engagement threshold, a reward to the user that is displayed on a social media web site of an enterprise that the user is part of, wherein the reward is viewable by other users in the enterprise who have access to the user's social media profile including those who attended the presentation.

2. A method according to claim 1, wherein the user input and output systems comprise: audio elements, and wherein monitoring the user input and output systems, comprises:
   determining whether the audio elements have been interacted with during the presentation mode.

3. A method according to claim 2, wherein communicating a message to the server system, wherein the processing system executes instructions to:
   communicating a message to the server system each time one of the audio elements is determined to have been interacted with during the presentation mode.

4. A method according to claim 1, wherein the user input and output systems comprise: a display configured to display a user interface, and wherein monitoring the user input and output systems, comprises:
   monitoring a state of the display during the presentation mode to determine whether the display has been interacted with during the presentation mode.

5. A method according to claim 4, wherein communicating a message to the server system, comprises:
   communicating a message to the server system each time the display is determined to have been interacted with during the presentation mode.

6. A method according to claim 1, wherein the engagement metric has a value that indicates a level of engagement of that user during the presentation, and wherein computing, comprises:
   decreasing the value of the engagement metric each time the server system receives a message from the user system unless a feedback message is received from the user system within a predetermined time after the message was received.

7. A method according to claim 6, further comprising:
   starting a timer at the server system each time a message is received, and monitoring for receipt of a feedback message from the user system; and
   when a feedback message is received from the user system prior to expiration of the timer: disregarding that message during computation of the engagement metric; and
   increasing the value of the engagement metric when computing the engagement metric for the user of the user system.

8. A method according to claim 1, further comprising:
   sending a notice message from the server system to the user system when the value of the engagement metric is less than the first engagement threshold, wherein the notice message indicates: that attendance credit for the presentation will not be given.

9. A server system, comprising:
   a processor system configured to: compute, based on messages received from a user system during a presentation to a group of users in attendance, an engagement metric for a user of a user system that indicates a level of engagement of that user during the presentation,
   wherein each of the messages indicates that interaction with either an input system of the user system or an output system of the user system have been detected during the presentation;
   wherein the processor system is further configured to:
   determine, after the presentation has concluded, whether a value of the engagement metric is less than a first engagement threshold;
   when the value of the engagement metric is determined to be greater than or equal to the first engagement threshold:
   create a record giving an attendance credit to the user for completing the presentation;
   determine whether the value of the engagement metric is greater than or equal to a second engagement threshold that is greater than the first engagement threshold; and
   issue a reward to the user that is displayed on a social media web site of an enterprise that the user is part of when the value of the engagement metric is determined to be greater than or equal to the second engagement threshold, wherein the reward is viewable by other users in the enterprise who have access to the user's social media profile including those who attended the presentation.

10. A server system according to claim 9, wherein the engagement metric has a value, wherein the server system is configured to decrease the value of the engagement metric for each message received when computing the engagement metric for the user of the user system unless a feedback message is received from the user system within a predetermined time after the message was received.

11. A server system according to claim 10, wherein the server system is configured to:
   start a timer each time a message is received and monitor for receipt of a feedback message from the user system; and
   when a feedback message is received from the user system prior to expiration of the timer: disregard the message during computation of the engagement metric, and increase the value of the engagement metric when computing the engagement metric for the user of the user system.

12. A server system according to claim 9, wherein the server system is configured to:
   when the value of the engagement metric is less than the first engagement threshold: send a notice message to the user system that indicates that attendance credit for the presentation will not be given.

13. A server system according to claim 9, wherein the server system is configured to:
   send the user system an identifier when the user is permitted to attend the presentation, and
   wherein server system further comprises:
   a presentation conference module that identifies the user as a registered attendee of the presentation based on the key, and automatically connects the user to a chat room page without a login process, wherein the identifier allows the user to access the chat room page,
   wherein the chat room page is established within an enterprise social network and is accessible by any other users within the same enterprise who are attending the presentation and allows the users to interactively communicate in real-time.

14. A system for encouraging user engagement during a presentation to a group of users, the system comprising:
   a server system; and
   a user system of a user, comprising: user input and output systems; memory configured to store an engagement module; and a processing system configured to execute the engagement module after a presentation mode is enabled at the user system, wherein upon execution of the engagement module, the processing system executes instructions to: monitor the user input and output systems of the user system to determine whether any of the user input and output systems of the user system have been interacted with during the presentation mode; and communicate a message to the server system each time the processing system determines that any of the user input and output systems of the user system have been interacted with during the presentation mode; and
   wherein the server system is configured to:
   compute, based on messages received from the user system, an engagement metric for a user of the user system that indicates a level of engagement of that user during the presentation;
   determine, after the presentation has concluded, whether a value of the engagement metric is less than a first engagement threshold;
   when the value of the engagement metric is determined to be greater than or equal to the first engagement threshold:
   create a record giving an attendance credit to the user for completing the presentation;
   determine whether the value of the engagement metric is greater than or equal to a second engagement threshold that is greater than the first engagement threshold; and
   issue a reward to the user that is displayed on a social media web site of an enterprise that the user is part of when the value of the engagement metric is determined to be greater than or equal to the second engagement threshold, wherein the reward is viewable by other users in the enterprise who have access to the user's social media profile including those who attended the presentation.

15. A system according to claim 14, wherein the user input and output systems comprise: audio elements, and wherein, as part of monitoring the user input and output systems and communicating a message to the server system, the processing system executes instructions to:
   monitor state of the audio elements during the presentation mode to determine whether the audio elements have been used or interacted with during the presentation mode; and
   communicate a message to the server system each time the processing system determines that the audio element has been interacted with during the presentation mode.

16. A system according to claim 14, wherein the user input and output systems comprise: a display configured to display a user interface, and wherein, as part of monitoring the user input and output systems of the user system and communicating a message to the server system, the processing system executes instructions to:
   monitor state of the display during the presentation mode to determine whether the display has been used or interacted with during the presentation mode; and
   communicate a message to the server system each time the processing system determines that the display has been interacted with during the presentation mode.

17. A system according to claim 14, wherein the engagement metric has a value, wherein the server system is configured to decrease the value of the engagement metric for each message received when computing the engagement metric for the user of the user system unless a feedback message is received from the user system within a predetermined time after the message was received.

* * * * *